(12) United States Patent
Ishikawa

(10) Patent No.: US 7,136,196 B2
(45) Date of Patent: Nov. 14, 2006

(54) E-MAIL NON-ARRIVAL INFORMATION NOTIFICATION METHOD AND DATA COMMUNICATION APPARATUS

(75) Inventor: Atsushi Ishikawa, Anjo (JP)

(73) Assignee: Minolta Co., Ltd., Osaka (JP)

( * ) Notice: Subject to any disclaimer, the term of this patent is extended or adjusted under 35 U.S.C. 154(b) by 974 days.

(21) Appl. No.: 10/103,695

(22) Filed: Mar. 25, 2002

(65) Prior Publication Data

US 2002/0140987 A1  Oct. 3, 2002

(30) Foreign Application Priority Data

Mar. 27, 2001  (JP) ............................. 2001-090478

(51) Int. Cl.
  *H04N 1/00* (2006.01)
(52) U.S. Cl. ..................... 358/402; 709/206; 358/405
(58) Field of Classification Search ................ 709/227, 709/206, 207, 229; 715/753; 358/468, 402, 358/406, 407, 1.15, 405; 379/100.08

See application file for complete search history.

(56) References Cited

U.S. PATENT DOCUMENTS

| 2002/0198949 A1* | 12/2002 | Maehiro | 709/206 |
| 2004/0054734 A1* | 3/2004 | Gilbert | 709/206 |
| 2005/0108402 A1* | 5/2005 | Colson et al. | 709/227 |
| 2005/0188017 A1* | 8/2005 | Ozaki | 709/206 |

FOREIGN PATENT DOCUMENTS

| JP | 10-178446 | 6/1998 |
| JP | 10-190728 | 7/1998 |
| JP | 10-215277 | 8/1998 |
| JP | 2000-4341 | 1/2000 |
| JP | 2000-041140 | 2/2000 |
| JP | 2000-41140 | 2/2000 |
| JP | 2000-156704 | 6/2000 |
| JP | 2000-354049 | 12/2000 |
| JP | 2001-7824 | 1/2001 |
| JP | 2001-56789 | 2/2001 |

\* cited by examiner

*Primary Examiner*—Jerome Grant, II
(74) *Attorney, Agent, or Firm*—Morrison & Foerster LLP

(57) ABSTRACT

A registered address that is normally used by the user and comprises personal information is input into an MFP apparatus. The MFP apparatus sends a command including the registered address to the mail provider, obtains a new address for which the registered address is designated as a forwarding address, and deletes the registered address from the MFP apparatus. Where the MFP apparatus receives an e-mail non-arrival notification, the MFP apparatus sends the non-arrival notification to the new address. The non-arrival notification sent to the new address is received by the mail provider and forwarded to the registered address. In this way, notification of the e-mail's non-arrival can be provided without the registered address remaining in the MFP apparatus.

9 Claims, 7 Drawing Sheets

M1: NON-ARRIVAL NOTIFICATION (MFP ADDRESS)
M2: NON-ARRIVAL NOTIFICATION (NEW ADDRESS)
M3: NON-ARRIVAL NOTIFICATION (REGISTERED ADDRESS)

E-MAIL NON-ARRIVAL INFORMATION NOTIFICATION METHOD AND DATA COMMUNICATION APPARATUS

The present application claims priority to Japanese Patent Application No. 2001-90478 filed Mar. 27, 2001, the entire content of which is hereby incorporated by reference.

BACKGROUND OF THE INVENTION

1. Field of the Invention

The present invention relates to a technology to send and receive e-mail messages over a network.

2. Description of the Related Art

As a data communication apparatus that can send and receive data over a network, an MFP (Multi-Function Peripheral) apparatus, for example, is known. An MFP is a multi-function apparatus having such functions as those of a scanner, a copier, a printer and a facsimile machine, and is further capable of sending image data obtained through reading carried out using the scanner or other function over a network such as the Internet via an e-mail message. The use of this MFP apparatus enables an image of an original document to be sent to a recipient such as another MFP apparatus or a PC through an easy operation.

When an e-mail message is sent from a sender to a recipient over a network such as the Internet, it is sent in a relay fashion across multiple mail servers. The e-mail is not sent directly to the recipient (the apparatus that is ultimately intended to receive the e-mail), as mentioned above, and in some cases the sent e-mail does not reach the intended recipient's address. In such a case, an e-mail message (non-arrival notification) comprising non-arrival information is returned some period of time after the original e-mail is sent.

As a result, a user that sends an e-mail using an MFP apparatus checks based on the sending history whether or not a non-arrival notification was returned after a certain period of time elapsed, thereby determining whether or not the e-mail was sent.

Incidentally, a service has been proposed in which an MFP apparatus described above is installed in a retail outlet such as a convenience store for use by the customers of the store. By allowing users who do not have an MFP at home to use this service, images of original documents can be sent to recipients via e-mail, vastly increasing user convenience.

When an MFP apparatus installed in a retail store is used in this way, in order to determine whether or not the transmitted e-mail was received, it is necessary to wait for an indefinite period of time to ensure that a non-arrival notification is not returned, which is extremely inconvenient for the user of the service.

With this situation as a backdrop, one possible approach is to have the user input his regular e-mail address in the MFP, such that when the MFP receives a non-arrival notification, the notification can be forwarded to the user's regular e-mail address in order to inform him of such non-arrival.

However, the storage of users' regular e-mail addresses in a retail store used by a large number of anonymous customers entails the risk of disclosure of personal information such as e-mail addresses.

SUMMARY OF THE INVENTION

An object of the present invention is to provide a method by which to deliver a notification of non-arrival of an e-mail message while preventing the disclosure of personal information.

Another object of the present invention is to provide a data communication apparatus that automatically obtains a new e-mail address for which a registered address is designated as a forwarding address.

These and other objects are attained using an e-mail non-arrival information notification method that includes the steps of inputting a registered address, a step of generating a new address and designating the registered address as a forwarding address for the new address, a step of receiving e-mail non-arrival information, a step of sending the non-arrival information to the new address, and a step of forwarding the non-arrival information sent to the new address to the registered address.

These and other objects are also attained by a data communication apparatus that can send and receive data over a network, wherein such data communication apparatus includes input means to input a registered address, and obtaining means to obtain over a network a new address for which the registered address is designated as a forwarding address.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

An embodiment of the present invention will be explained below with reference to the drawings.

<Network System>

Figure 1:
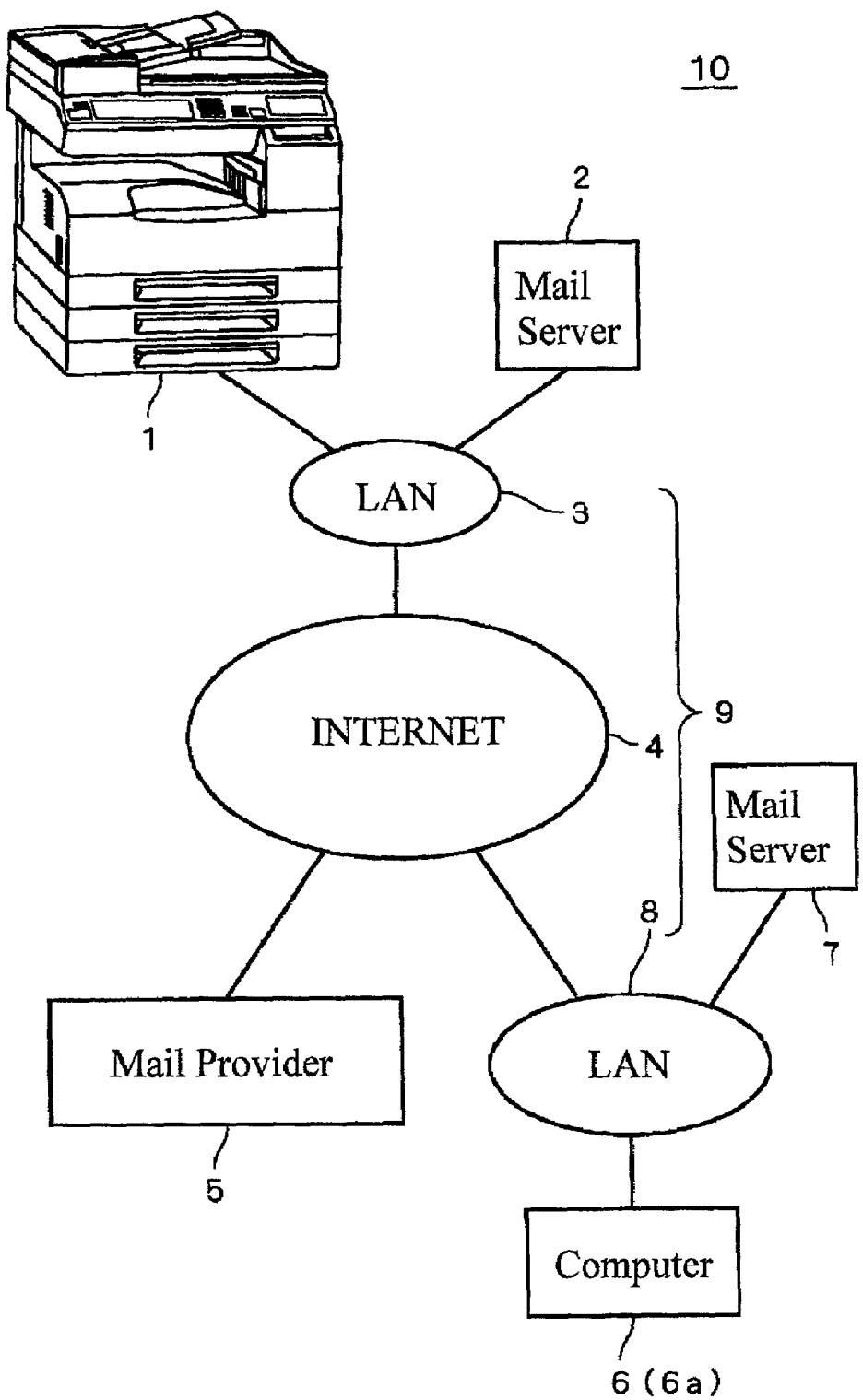
FIG. 1 is a drawing showing one example of the network system applied in an embodiment of the present invention.

FIG. 1 is a summary drawing of the network system of this embodiment. As shown in the drawing, the network system 10 includes an MFP apparatus 1 that comprises the data communication apparatus pertaining to this embodiment and is located in a retail outlet such as a convenience store, a mail server 2 used by the MFP apparatus 1, a mail provider 5 that provides an e-mail forwarding service, a computer 6, and a mail server 7 used by the computer 6, each of which is connected via the Internet 4 and LANs 3 and 8. The LANs 3 and 8 are each connected to the Internet 4 via a router device, a firewall, etc. that are omitted in the drawing. In the discussion below, the Internet 4 and the LANs 3 and 8 will be collectively referred to as the network 9.

The mail servers 2 and 7 each provide the publicly-known service of sending and receiving e-mails. The mail server 2 is connected to the LAN 3, to which the MFP 1 is also connected, and provides the service of sending and receiving e-mails to and from the MFP apparatus 1. Similarly, the mail server 7 is connected to the LAN 8, to which the computer 6 is also connected, and provides the service of sending and receiving e-mails to and from the computer 6.

The computer 6 is a personal computer or similar device that can send and receive e-mail, and in actuality, multiple computers 6 are connected to the Internet 4 via a LAN or a phone network. In the drawing, a computer 6 that is normally used by a single user who uses the MFP apparatus 1 is shown as a representative user computer 6a. Because the user who uses the MFP apparatus 1 is not specified, the computers 6 connected to the Internet 4 may respectively comprise user computers 6a corresponding to the users using the MFP apparatus 1.

<Mail Provider>

The server 5 installed in the mail provider (hereinafter referred to simply as the 'mail provider') provides a e-mail forwarding service, which is in the public domain, and has an e-mail address generating function and a mail forwarding server function. Specifically, the mail provider 5 generates a new e-mail address having a prescribed domain name (hereinafter referred to as a 'new address') in response to an address generation request issued over a network from an external apparatus such as the MFP apparatus 1. It then designates and stores as a forwarding address for this new address a registered e-mail address (hereinafter referred to as a 'registered address') sent when the address generation request is issued. Through this designation, the e-mail sent to the new address is forwarded to the registered address via the e-mail forwarding server function of the mail provider 5. In addition, the mail provider 5 has a function to delete a previously generated e-mail address in response to an address deletion request issued by an external apparatus over the network.

The external apparatus that uses the services of the mail provider 5 issues the above address generation request and address deletion request by sending prescribed, preset request commands over the network to the mail provider 5.

When an address generation request is issued by an external apparatus, a command including the registered address that will become the forwarding address is sent to the mail provider 5. In response to this address generation request, the mail provider 5 returns a new address for which the registered address is designated as the forwarding address, the account name of the new address, the password to be used when the new address is deleted, and other information. The new address has a prescribed format, i.e., 'xxx@aaa.ne.jp', and comprises the account name (the 'xxx' part) and a prescribed domain name (the 'aaa.ne.jp' part). In this embodiment, the account name is randomly determined by the mail provider 5 to comprise a unique name for that domain, but it is also acceptable if the account name is specified when the address request is issued by the external apparatus, so long as it does not duplicate an already-issued account name.

At the same time, when the external apparatus issues an address deletion request, a command including the account name and password of the e-mail address to be deleted is sent to the mail provider 5. In response to the address deletion request, the mail provider 5 refers to a table that links account names and passwords stored when an e-mail address is created, determines that the password for the sent account name is correct, and deletes the e-mail address.

<Apparatus Construction>

The MFP apparatus 1 will now be explained. The MFP apparatus 1 is a multi-function apparatus that has the functions of a scanner, copier, printer, facsimile machine and the like, and can send and receive data over a network.

Figure 2:
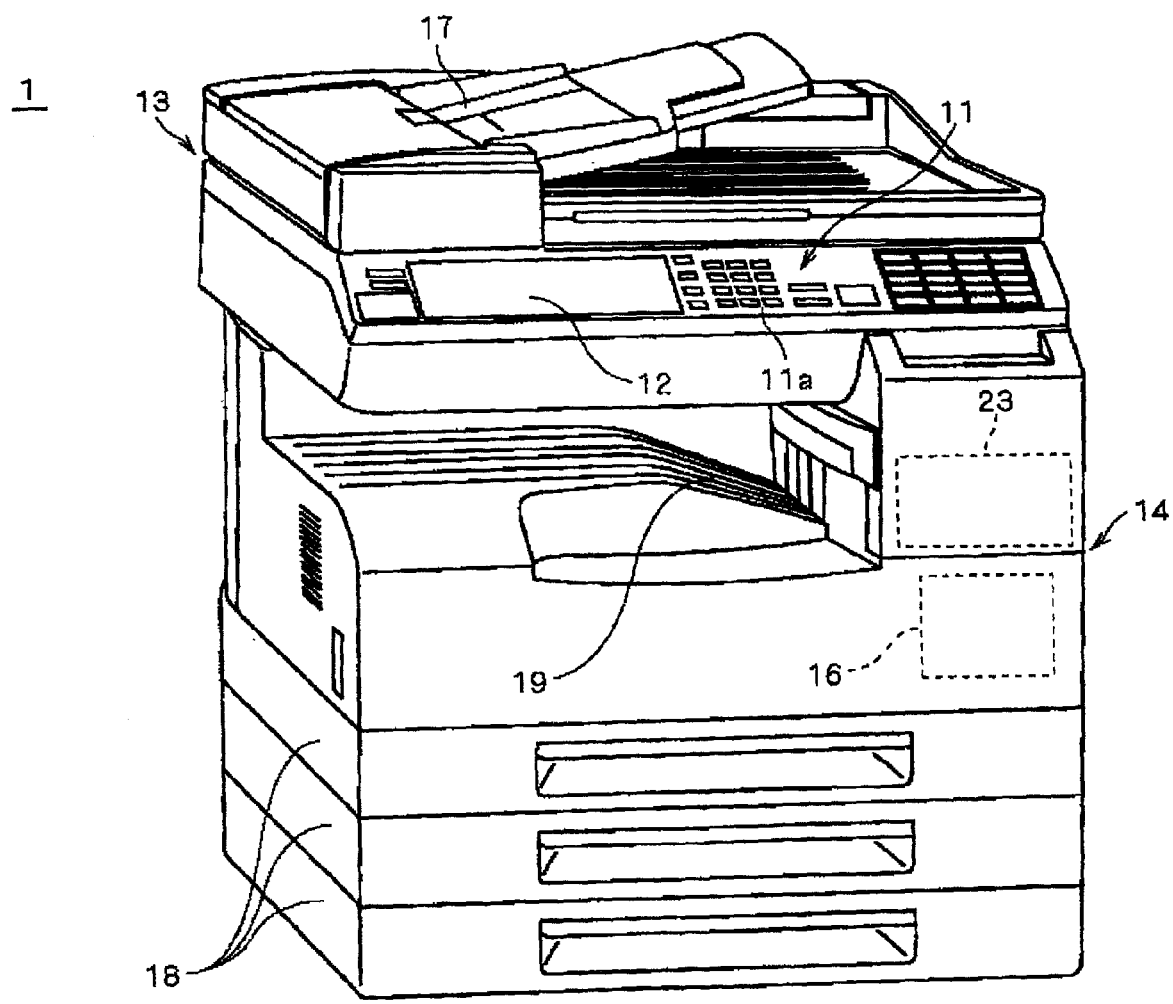
FIG. 2 is an external view of the MFP apparatus comprising the data communication apparatus pertaining to the present invention.

FIG. 2 is an external view of the MFP apparatus 1. As shown in FIG. 2, the MFP apparatus 1 includes an operation unit 11 that receives user input of various types of commands and data such as letters and numbers, a display 12 that displays user command menus and information pertaining to obtained images, a scanner unit 13 that obtains image data through the electrooptical reading of an original document, and a printer unit 14 that prints images on recording sheets based on image data.

The MFP 1 further includes a feeder unit 17 that is located at the top of the main unit and sends original documents to the scanner unit 13, a paper supply unit 18 that is located at the bottom of the main unit and sends recording sheets to the printer unit 14, a tray 19 which is located in the middle of the main unit and onto which recording sheets on which images have been printed by the printer unit 14 are ejected, and an internal communication unit 16 that sends and receives various data over a network 9. In addition, while not shown in the drawing, the MFP 1 has a network interface, and the communication unit 16 is connected to the network 9 via the network interface such that it can send and receive various data to and from external apparatus.

The display 12 is a touch panel-type display used to perform various types of display, including display of command menus pertaining to e-mail. The operation unit 11 has multiple keys 11a that enable various types of input, including the selection of e-mail-related command menu items. These functions as essential elements of the user interface, and the user can input various types of information via the operation unit 11 while confirming the contents displayed on the display 12.

The scanner unit 13 obtains image data through the electrooptical reading of image information, such as photographs, letters, drawings and the like, from an original document. The obtained image is converted into digital data, and after it is stored in an image memory described below, it is sent to the printer unit 14 or the communication unit 16, and thereafter supplied for image printing or data transmission.

The printer unit 14 prints images on recording sheets based on image data obtained from the scanner unit 13, or image data received from an external apparatus via the communication unit 16. Therefore, the MFP apparatus 1 serves as a copier by printing via the printing unit 14 image data obtained via the scanner unit 13.

The communication unit 16 sends and receives facsimile data over public telephone lines, and in addition sends and receives various types of data over the network 9 to and from external apparatuses such as the mail server 2 and mail provider 5 that are connected to the network 9, using a prescribed protocol. In this way, the MFP 1 functions not only as a facsimile device that performs facsimile transmission, but also functions as a data transmission apparatus over the network 9.

Figure 3:
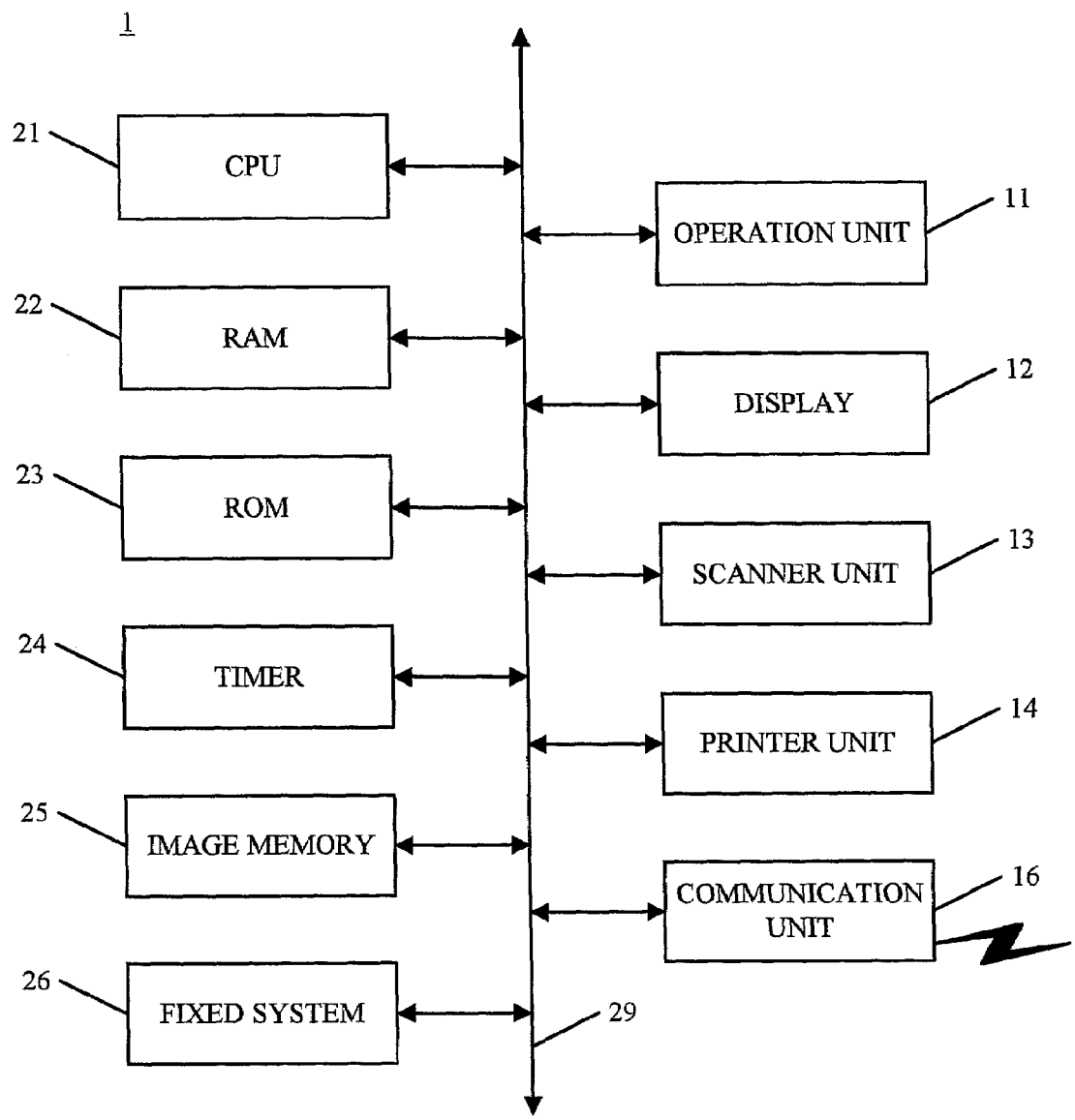
FIG. 3 is a block diagram showing the construction of the MFP apparatus, including the internal construction thereof.

FIG. 3 is a drawing showing the construction of the MFP apparatus 1, including the internal construction thereof, in the form of function blocks. As shown in the drawing, the MFP apparatus 1 includes a CPU 21 that performs various types of arithmetic processing, a RAM 22 comprising a rewritable and readable memory that serves as a work area, a ROM 23 comprising a read-only memory that stores control programs and the like, a timer 24 having a clocking function, an image memory 25 in which is stored image data input from the scanner unit 13 or the communication unit 16, and a fixed disk 26 that stores various types of information, and each of these components is electrically connected via a bus line 29.

Also electrically connected to the bus line 29 are the operation unit 11, the display 12, the scanner unit 13, the printer unit 14, the communication unit 16, etc. The data communication among the various components of the MFP 1 takes place mainly via the bus line 29. The CPU 21 carries out prescribed processing in response to input from the operation unit 11, as well as operation control over the scanner unit 13, the printer unit 14 and the communication unit 16, via arithmetic processing based on control programs stored in the ROM 23.

Figure 4:
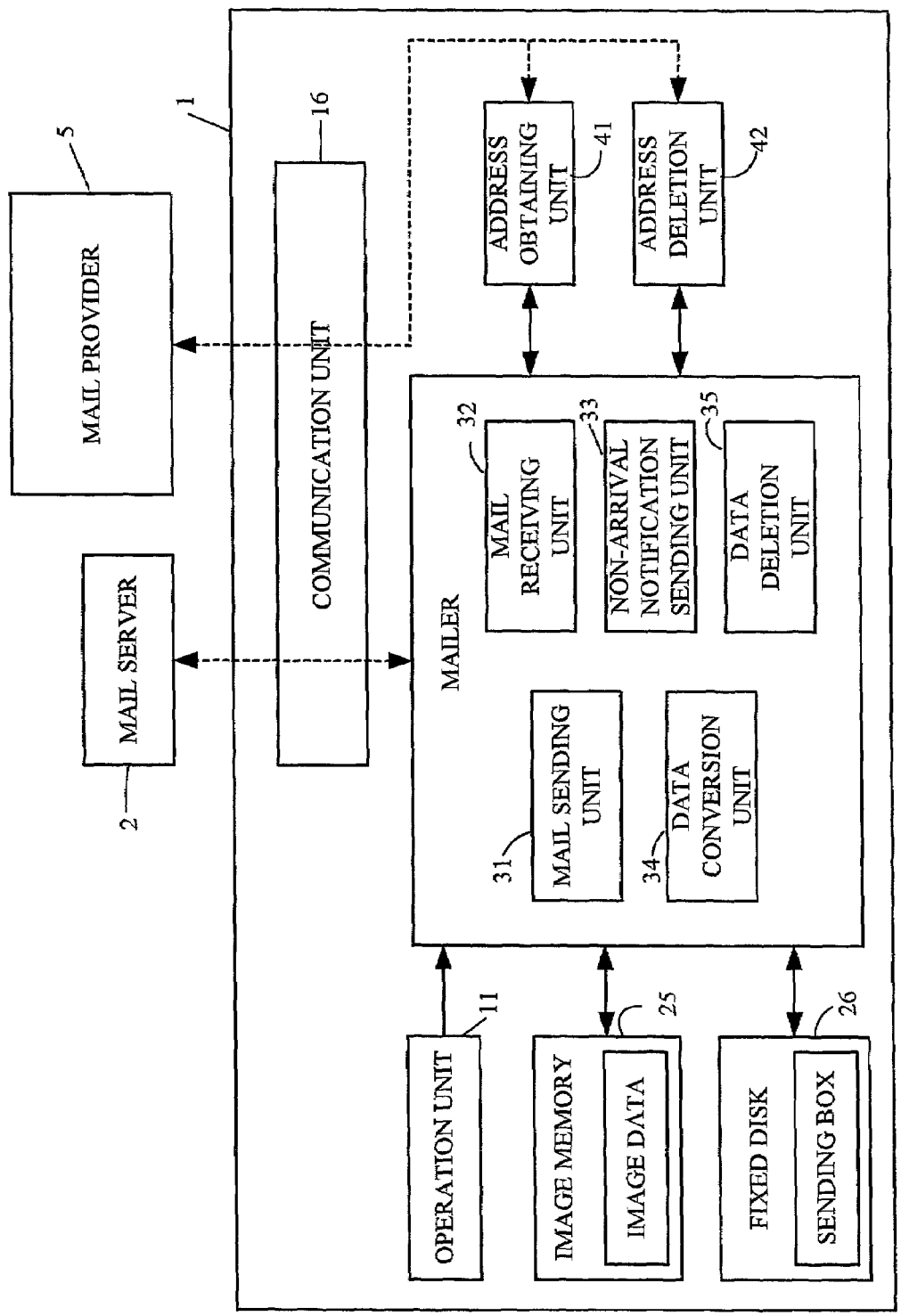
FIG. 4 is a block diagram showing the construction of the MFP apparatus, including the functions implemented by the operation control program thereof.

FIG. 4 is a drawing showing the functions pertaining to this embodiment extracted from the functions realized by the operation control program, together with other components. Among the components that are shown in FIG. 3, the mailer 30, the address obtaining unit 41 and the address deletion unit 42 are the functions realized by the CPU 21 or the like.

The mailer 30 performs various processing and control tasks related to the sending and receiving of e-mail, and includes a mail sending unit 31, a mail receiving unit 32, a non-arrival notification sending unit 33, a data conversion unit 34 and a data deletion unit 35.

The mail sending unit 31 performs processing related to the sending of e-mail. It connects to the mail server 2 based on a prescribed protocol via the communication unit 16 and sends e-mail messages.

The mail receiving unit 32 performs processing related to the receiving of e-mail. The MFP apparatus 1 has its own e-mail address (hereinafter referred to as the 'MFP address'), and the mail receiving unit 32 connects to the mail server 2 based on a prescribed protocol via the communication unit 16 at fixed intervals (such as every five minutes, every ten minutes, etc.) and receives the e-mail messages sent to the MFP apparatus 1.

The e-mail messages received by the mail receiving unit 32 include an e-mail indicating non-arrival information (hereinafter referred to as a 'non-arrival notification') where the sent e-mail does not arrive. A non-arrival notification is returned to the sending e-mail address included in the mail header of the e-mail. Because the MFP address is indicated as the sending e-mail address, where the sent e-mail does not arrive, the non-arrival notification is returned to the MFP apparatus 1.

The non-arrival notification may consist of an e-mail in which the main text includes the subject name of the non-arriving e-mail and a message that the e-mail did not arrive, an e-mail in which the main text includes the reason for and history of the non-arrival (information indicating the relay servers such as that under 'Received') or an e-mail to which image information that was not delivered is attached. Where image information that was not delivered is attached to the non-arrival notification, it can be resent without re-reading of the original image.

The non-arrival notification sending unit 33 sends a non-arrival notification to the e-mail address designated prior to sending when notification of non-arrival is received by the mail receiving unit 32.

The data conversion unit 34 converts the image data to be sent into a format that can be sent via e-mail and attaches it to e-mail. Because binary data cannot be directly included in e-mail, the image data obtained by the scanner unit 13 or other component, which comprises binary data (bitmap data), cannot be sent as e-mail. Accordingly, image data is first compressed using the MH encoding method and converted to TIFF-F format, and then into MIME-encoded data using the MIME (Base 64) or other encoding method. By virtue of this data conversion processing, image data can be sent as an attachment to e-mail. Furthermore, where image data is attached to the received e-mail, the MIME-encoded data included in the e-mail is converted back to the original image data (bitmap data) or other format.

The data deletion unit 35 deletes image data that was obtained by the scanner unit 13 or other component and saved in the image memory 25. Image data deletion takes place when a prescribed interval elapses after transmission of the e-mail to which the image data is attached, or after the non-arrival notification for that e-mail is sent.

The address obtaining unit 41 connects to the mail provider 5 via the communication unit 16 based on a command issued by the mailer 30, and obtains a new e-mail address. An address generation request is issued by sending to the mail provider 5, based on a prescribed protocol, a command that includes a registered address input by the user. The new address for which the registered address is designated as the forwarding address, the account name and the password are then obtained.

The address deletion unit 42 connects to the mail provider 5 via the communication unit 16 and based on a command issued by the mailer 30, deletes from the mail provider 5 the new address obtained by the address obtaining unit 41. By sending to the mail provider 5, based on a prescribed protocol, a command that includes the account name to be deleted and the password, the new address having that account name is deleted.

Figure 5:
FIG. 5 is a drawing showing one example of a sending box describing various configuration information for an e-mail.

The mailer 30 writes various configuration information regarding the e-mail in the sending box comprising a management information table stored on the fixed disk 26 and manages e-mail. FIG. 5 is a drawing showing one example of the sending box. As shown in the drawing, the sending box SB comprises multiple columns of fields.

The 'No' field indicates the unique ID number by which the e-mail to be sent by the MFP apparatus 1 is identified. This ID number is automatically assigned to the e-mail in the order of registration.

The 'Recipient address' field indicates the e-mail address comprising the receiving address for the e-mail. It is entered in the field through user operation of the operation unit 11, and multiple e-mail addresses can be entered for one e-mail.

The 'Image number' field indicates the unique ID numbers by which the attached image data files are identified. These numbers are automatically assigned in the order they are obtained by the scanner unit 13. Because multiple image data files can be attached to a single e-mail, the ID numbers of multiple image data files can be entered in this field.

The 'Date and time sent' field indicates the date and time that the e-mail was sent to the mail server 2. This date and time are obtained from the timer 24 and entered in the field by the mail sending unit 31.

The 'Non-arrival notification recipient' field indicates the e-mail address to receive the notification of non-arrival of the e-mail. In other words, it is the e-mail address comprising the receiving address used by the non-arrival notification sending unit 33, and either the registered address normally used by the user (the e-mail address used by the user computer 6a or the like in FIG. 1) or the new address obtained using the mail provider 5 is used. The user selects whether the registered address or the new address should be used. In addition, the user can also indicate that a non-arrival notification need not be sent, and in such a case this field is blank.

The 'Account name' field indicates the account name received when the new address was obtained, and the 'Password' field indicates the password received when the new address was obtained. These fields are used when a new address deletion request is issued by the address deletion unit 42. Where the 'Non-arrival notification recipient' field does not contain a new address, the 'Account name' and 'Password' fields are blank.

In this embodiment, the sending box SB is stored on the fixed disk 26, but it may alternatively be stored in the RAM 22.

<Processing Sequence>

Figure 6:
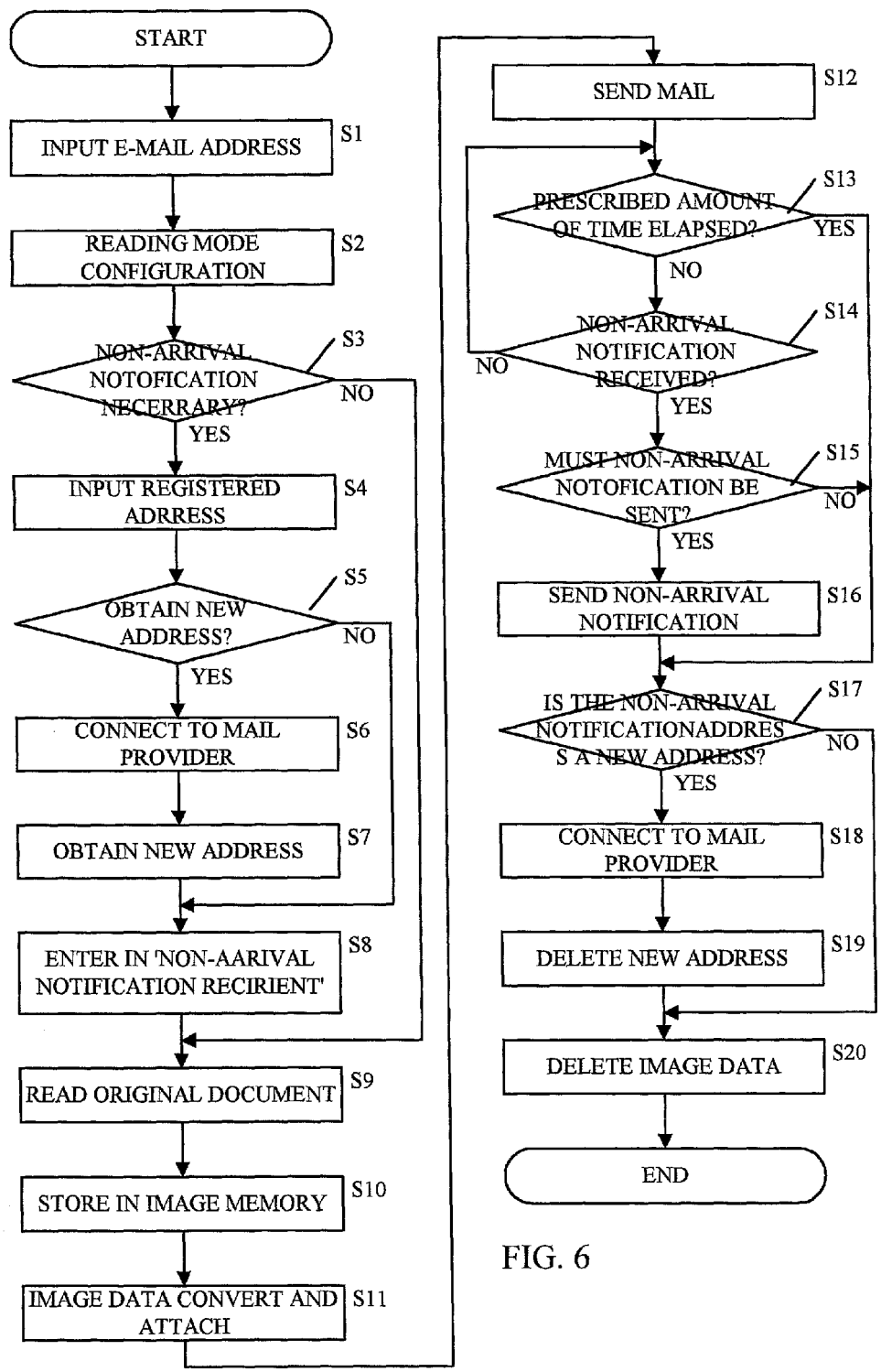
FIG. 6 is a drawing showing the sequence of an e-mail transmission process and a non-arrival notification transmission process.

The e-mail sending process and non-arrival notification sending process executed by the MFP apparatus 1 having the construction described above will now be explained. FIG. 6 is a drawing showing the sequence of the e-mail sending process and the non-arrival notification sending process.

When a command to send an e-mail is issued via user operation, the input screen by which to enter the e-mail address comprising the recipient address for the e-mail is displayed on the display 12 through a process executed by the mailer 30, and this e-mail address is input by the user. The mailer 30 also adds one line to enter the information regarding the e-mail in the sending box SB, assigns an ID number for the e-mail in the 'No' field, and enters the input e-mail address in the 'Recipient address' field (step S1).

A reading mode configuration screen for the reading of the original document that will become the image data to be attached to the e-mail is displayed on the display 12. Such information as the size of the original document, as well as the resolution, color (monochrome or color), etc. of the image data to be obtained is specified via this reading mode configuration screen (step S2).

Next, the mailer 30 asks the user via the display 12 whether or not the sending of an e-mail non-arrival notification is necessary (step S3). Here, if the user indicates that a non-arrival notification is not necessary, the MFP apparatus 1 advances to step S9 and reading of the original document begins.

However, if the user indicates that a non-arrival notification is necessary, the mailer 30 causes the input screen for the e-mail address comprising the final addressee for the non-arrival notification to be displayed, and the registered address normally used by the user on the user computer 6a or other apparatus is input (step S4). The registered address input here also comprises personal information regarding the user. The input registered address is stored temporarily in the RAM 22.

The mailer 30 then asks the user whether or not to obtain a new address from the mail provider 5 (step S5). Where the user prefers not to have the input registered address remain in the MFP apparatus 1, the option to obtain a new address is selected. Where the user does not object to the registered address remaining in the MFP apparatus 1, the option to not obtain a new address is selected. Where the option to not obtain a new address is selected, the MFP apparatus 1 advances to step S8 and the registered address is entered as is in the 'Non-arrival notification recipient' field of the sending box SB as the recipient of the non-arrival notification.

Where the option to obtain a new address is selected, the address obtaining unit 41 connects to the mail provider 5 (step 6) and requests the generation of a new address by sending a prescribed command including the registered address. In response to this request, the mail provider 5 generates a new address, account name and password, and designates the registered address as a forwarding address for the new address. The generated new address, account name and password are returned by the mail provider 5 to the MFP apparatus 1, and are obtained by the address obtaining unit 41 (step S7).

The new address obtained by the address obtaining unit 41 is then entered by the mailer 30 in the 'Non-arrival notification recipient' field of the sending box SB as the recipient of the non-arrival notification (step S8). The registered address is deleted from the RAM 22 at this point. This ensures that personal information regarding the user, i.e., the registered address, does not remain in the MFP apparatus 1. The account name and password that were obtained at the same time are also entered in the 'Account name' and 'Password' fields of the sending box SB, respectively.

In accordance with the reading mode set in step S2 above, reading of the original document located in the feeding unit 17 is then carried out by the scanner unit 13 (step S9). The read original document image is stored in the image memory 25 as image data (step S10), and is converted to MIME-encoded data by the data conversion unit 34 and attached to an e-mail (step S11). After being attached to the e-mail, the image data read by the scanner unit 13 is still stored in the image memory 25.

A mail header is created by the mail sending unit 31 for the e-mail to which the image is attached, and the e-mail is sent to the mail server 2 by the communication unit 16. At the same time, the mail sending unit 31 enters the date and time at which the e-mail was sent to the mail server 2 in the 'Date and time sent' field in the sending box SB (step S12).

Where a non-arrival notification is received regarding the e-mail after it is sent as described above, processing to send a non-arrival notification to the designated non-arrival notification recipient e-mail address is carried out. This processing will be described below.

First, it is determined by the mailer 30 whether or not a prescribed amount of time has elapsed since the e-mail was sent to the mail server 2 (step S13). In other words, it is determined whether or not a prescribed interval has elapsed since the date and time entered in the 'Date and time sent' field in the sending box SB.

Where the prescribed time interval has not elapsed, it is determined whether the mail receiving unit 32 has received a non-arrival notification (step S14). Here, where a non-arrival notification has not been received, the MFP apparatus 1 returns to step S13 and it is determined once more whether or not a prescribed time interval has elapsed. In other words, it is determined in steps S13 and S14 whether or not a non-arrival notification has been received during a prescribed period of time. If a non-arrival notification is not received during this prescribed interval, it is determined that the e-mail was sent to the recipient e-mail address without error, and the MFP apparatus 1 advances to step S17.

On the other hand, if a non-arrival notification is received, it is determined whether or not a non-arrival notification must be sent by the non-arrival notification sending unit 33 (step S15). Specifically, it is determined whether or not the 'Non-arrival notification recipient' field in the sending box SB is blank. If it is blank, a non-arrival notification need not be sent, and the MFP apparatus 1 advances to step S17.

Where a non-arrival notification must be sent, the non-arrival notification sending unit 33 sends in the form of an e-mail the non-arrival notification to the e-mail address entered in the 'Non-arrival notification recipient' field in the sending box SB. In other words, the non-arrival notification is sent to either the registered address or the new address (step S16).

Where it is sent to the registered address, the non-arrival notification is received by the user computer 6*a* (see FIG. 1) as is, and the user is notified that the e-mail did not arrive.

Figure 7:
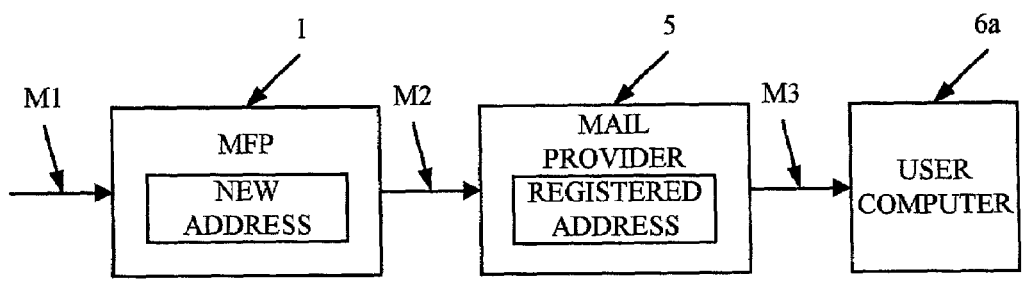
FIG. 7 is a conceptual drawing showing the transmission route where a non-arrival notification is sent to a new address.

If it is sent to the new address, however, the non-arrival notification is received by the mail provider 5 and is then forwarded to the registered address. FIG. 7 is a conceptual drawing showing the forwarding route where the non-arrival notification is sent to the new address.

Because the non-arrival notification M1 is first returned to the MFP's e-mail address, it is received by the MFP apparatus 1. The non-arrival notification M1 received by the MFP apparatus 1 is sent as a non-arrival notification M2 in which the new address is listed as the recipient address. This non-arrival notification M2 is received via the forwarding server function of the mail provider 5. It is then forwarded by the mail provider 5 to the user's registered address as a non-arrival notification M3 in which the registered address is listed as the recipient address. The recipient address is changed in a sequential fashion in this way, so that the non-arrival notification M3 is ultimately received by the user computer 6*a*, and the user is notified that the e-mail did not arrive. As a result, the user can be notified of the e-mail's failure to arrive without leaving the registered address, which comprises personal information regarding the user, in the MFP apparatus 1.

Returning to FIG. 6, it is determined by the address deletion unit 42 whether or not the non-arrival notification recipient address is a new address (step S17). Specifically, it is determined whether the 'Account name' field in the sending box SB has text entered therein or is blank, and if text is entered therein, it is determined that the non-arrival notification recipient address comprises a new address. If a new address is not entered in the field, the MFP apparatus 1 advances to step S20.

If a new address is entered in the 'Account name' field, the address deletion unit 42 connects to the mail provider 5 (step S18), and issues a request for the deletion of the new address by sending a prescribed command including the account name and password of the new address. The mail provider 5 deletes the new address in response to this command (step S19). As a result, the registered address that was designated as the forwarding address for the new address is also deleted, and personal user information does not remain in the mail provider 5.

The image data saved in the image memory 25 is then deleted by the data deletion unit 35, and processing is ended (step S20). Because the image data is deleted after a prescribed time interval has passed or sending of the non-arrival notification is completed, the image data is saved for this period, enabling personal information included in the image data to be deleted while still enabling the image data to be efficiently resent where it is to be resent.

<Variations>

While an embodiment of the present invention was described above, the present invention is not limited to this embodiment. For example, some or all of the functions realized by the CPU 21 of the MFP apparatus 1 of the above embodiment via software processing can alternatively be realized through dedicated circuits.

Furthermore, in the above embodiment the registered address normally used by the user computer 6*a* or the like was designated as the forwarding address at all times when a new address is generated, but it is acceptable if the registered address is not designated as a forwarding address, and if the non-arrival notification is received directly by the user computer 6*a* or the like after it is sent to the new address. In other words, it is acceptable if the user performs various settings regarding the obtained new address in the mail software or the like for the user computer 6*a* that is regularly used, so that the non-arrival notification may be received upon the sending of a request to receive such notification from the mail server of the mail provider 5. This enables the user to be notified of the non-arrival of the e-mail without the need to input the registered address in the MFP apparatus 1, and further ensures the prevention of disclosure of personal information.

Moreover, in the above embodiment, the registered address is input and a new address is obtained before reading of the original document is begun, but it is acceptable if these operations are executed while reading of the original document is underway or after the original document is read but before sending is begun. Carrying out these operations prior to reading of the original document serves to prevent the user from forgetting to designate a non-arrival notification recipient. Carrying out these operations while reading of the original document is underway or after the original document is read would enable more effective use of the time during which the user is waiting, thereby allowing the amount of time that the MFP apparatus is used to be reduced. In addition, the registered address can be input after sending of the data is commenced. If the registered address is input after sending of the data is commenced, input can be performed only after errors occur regarding the transmission from the MFP or after such errors have been confirmed, and therefore wasteful input can be omitted.

In the above embodiment, the image data attached to the e-mail was obtained through electrooptical reading by the scanner unit 13, but it is acceptable if image data received externally over the network 9 via e-mail, or image data received through sending using a fax function, for example, is used instead.

Furthermore, while image data was sent as an e-mail attachment in the above embodiment, the present invention is not limited to this implementation, and it is acceptable if, for example, binary data other than image data, such as sound data or text data, is attached to an e-mail and sent, or if an e-mail is sent without the attachment of binary data.

In the above embodiment, the MFP apparatus 1 connects to the Internet via the LAN 3, but it is also acceptable if, for example, it connects through the Internet through a dial-up connection using a prescribed Internet service provider or the like over phone lines.

While the data communication apparatus of the above embodiment comprised an MFP apparatus, the present invention is not limited to this implementation, and the technology of the present invention is capable of application so long as such apparatus is a data communication apparatus that can send and receive data over a network.

As described above, using this embodiment, because the received non-arrival information regarding an e-mail is sent to a new address, and because the non-arrival information sent to the new address is forwarded to the registered address, the user can be notified of the e-mail's non-arrival without the registered address, which comprises personal user information, remaining in the apparatus, and the disclosure of personal information can be prevented.

Using the above embodiment, a new address for which the registered address is designated as a forwarding address can be automatically obtained over the network.

Additionally, because the e-mail non-arrival notification is sent to the obtained new address, the user can be notified of the e-mail's non-arrival without the registered address that comprises personal information remaining in the MFP apparatus 1. As a result, the disclosure of personal information can be prevented.

Furthermore, because the new address for which the registered address is designated as a forwarding address can be deleted over the network, the disclosure of personal information can be further prevented. In particular, because the new address is deleted after the non-arrival notification has been sent to the new address, the new address can be deleted after the user is notified of the non-arrival. Moreover, because the new address is deleted after a prescribed period of time elapses after the e-mail is sent, the new address can be deleted after it is ensured that the e-mail was safely sent to the recipient.

In addition, even where image data is attached to the e-mail, the user can be notified of the e-mail's non-arrival without personal information remaining in the data communication apparatus. In particular, because the image data obtained by the image input means is stored in the memory means and is deleted only after the sending of the non-arrival notification is completed, the image data is saved until sending of the non-arrival notification is completed. As a result, where the image data is to be resent, it can be resent efficiently and the disclosure of personal information included in the image data can be prevented.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An e-mail non-arrival information notification method comprising:
   inputting a registered address;
   generating a new address and designating the registered address as a forwarding address for the new address;
   receiving e-mail non-arrival information;
   sending the non-arrival information to the new address; and
   forwarding the non-arrival information sent to the new address to the registered address.

2. A data communication apparatus that can send and receive data over a network, said data communication apparatus comprising:
   input means for inputting a registered address;
   obtaining means for obtaining over a network a new address for which the registered address is designated as a forwarding address;
   mail sending means for sending an email;
   receiving means for receiving a non-arrival information of the e-mail;
   non-arrival information sending means for sending the non-arrival information to the new address; and
   address delete means for deleting the new address over the network.

3. A data communication apparatus as claimed in claim 2, wherein said address delete means is configured to delete the new address after the non-arrival information has been sent to the new address.

4. A data communication apparatus as claimed in claim 2, wherein said address delete means is configured to delete the new address when a prescribed time elapsed after the e-mail was sent by said mail sending means.

5. A data communication apparatus that can send and receive data over a network, said data communication apparatus comprising:
   input means for inputting a registered address;
   obtaining means for obtaining over a network a new address for which the registered address is designated as a forwarding address;
   mail sending means for sending an email;
   receiving means for receiving a non-arrival information of the e-mail;
   non-arrival information sending means for sending the non-arrival information to the new address;
   image input means for inputting image data;
   attach means for attaching the image data inputted by said image input means to the e-mail;
   store means for storing image data inputted by said image input means; and
   image data delete means for deleting image data stored by said storing means after the non-arrival information of the e-mail to which the image data attached has been sent to the new address.

6. A data communication apparatus that can send and receive data over a network, said data communication apparatus comprising:
   an operation unit for inputting a registered address;
   an address obtaining unit for obtaining over a network a new address for which the registered address is designated as a forwarding address;
   a mail sending unit for sending an email;
   a mail receiving unit for receiving a non-arrival information of the e-mail;
   a non-arrival information sending unit for sending the non-arrival information to the new address; and
   an address deletion unit for deleting the new address over the network.

7. A data communication apparatus as claimed in claim 6, wherein said address deletion unit is configured to delete the new address after the non-arrival information has been sent to the new address.

8. A data communication apparatus as claimed in claim 6, wherein said address deletion unit is configured to delete the new address when a prescribed time elapsed after the e-mail was sent by said mail sending means.

9. A data communication apparatus that can send and receive data over a network, said data communication apparatus comprising:
- an operation unit for inputting a registered address;
- an address obtaining unit for obtaining over a network a new address for which the registered address is designated as a forwarding address;
- a mail sending unit for sending an email;
- a mail receiving unit for receiving a non-arrival information of the e-mail;
- a non-arrival information sending unit for sending the non-arrival information to the new address;
- a scanner unit for inputting image data;
- a data conversion unit for attaching the image data inputted by said image input means to the email;
- an image memory for storing image data inputted by said image input means; and
- a data deletion unit for deleting image data stored by said image memory after the non-arrival information of the e-mail to which the image data attached has been sent to the new address.

* * * * *